(12) United States Patent
Maeda

(10) Patent No.: US 10,398,147 B2
(45) Date of Patent: Sep. 3, 2019

(54) OVEN INCLUDING VARIABLE-LENGTH BAKING REGION

(71) Applicants: Naigai Vicars Co., Ltd., Tokyo (JP); Naigai Industries, Inc., Tokyo (JP)

(72) Inventor: Masahiro Maeda, Tokyo (JP)

(73) Assignees: Naigai Vicars Co., Ltd., Tokyo (JP); Naigai Industries, Inc., Tokyo (JP)

(*) Notice: Subject to any disclaimer, the term of this patent is extended or adjusted under 35 U.S.C. 154(b) by 436 days.

(21) Appl. No.: 15/219,491

(22) Filed: Jul. 26, 2016

(65) Prior Publication Data

US 2017/0042164 A1 Feb. 16, 2017

(30) Foreign Application Priority Data

Aug. 12, 2015 (JP) ................................. 2015-159563

(51) Int. Cl.
*A21B 1/48* (2006.01)
*A21B 1/33* (2006.01)
*A21B 1/40* (2006.01)

(52) U.S. Cl.
CPC . *A21B 1/48* (2013.01); *A21B 1/40* (2013.01)

(58) Field of Classification Search
CPC .................................... A21B 1/48; A21B 1/40
USPC ......................................................... 99/331
See application file for complete search history.

(56) References Cited

U.S. PATENT DOCUMENTS

| 2,339,974 | A | * | 1/1944 | Austin | ................ A47J 27/0817 126/19 M |
| 2,364,080 | A | * | 12/1944 | Kruse | ................... F26B 15/085 34/213 |
| 4,930,488 | A | * | 6/1990 | Pearman | ................... F24C 3/12 126/39 BA |
| 5,134,263 | A | * | 7/1992 | Smith | ...................... A21B 2/00 219/682 |
| 6,523,328 | B1 | * | 2/2003 | De Cardenas | ........ B65B 61/205 53/133.1 |
| 2013/0168384 | A1 | * | 7/2013 | Cadima | ................... H01F 38/14 219/647 |
| 2014/0033932 | A1 | * | 2/2014 | McKee | ................. A21B 1/245 99/448 |
| 2014/0083309 | A1 | * | 3/2014 | Reese | ................... A47J 39/003 99/474 |

(Continued)

FOREIGN PATENT DOCUMENTS

JP H10-248473 9/1998

*Primary Examiner* — Dana Ross
*Assistant Examiner* — Kuangyue Chen
(74) *Attorney, Agent, or Firm* — IPUSA, PLLC

(57) ABSTRACT

An oven includes a conveying part configured to convey a food material, a first region and a second region to perform a first baking process and a second baking process, respectively, on the conveyed food material, and an intermediate region between the first region and the second region. The oven further includes a movable first partition provided between the first region and the intermediate region and a movable second partition provided between the intermediate region and the second region. The intermediate region is added as a region to perform the first baking process to the first region in response to the first partition being opened and the second partition being closed. The intermediate region is added as a region to perform the second baking process to the second region in response to the first partition being closed and the second partition being opened.

6 Claims, 9 Drawing Sheets

(56) References Cited

U.S. PATENT DOCUMENTS

2017/0105420 A1* 4/2017 Bibaric ................ A21B 5/023

* cited by examiner

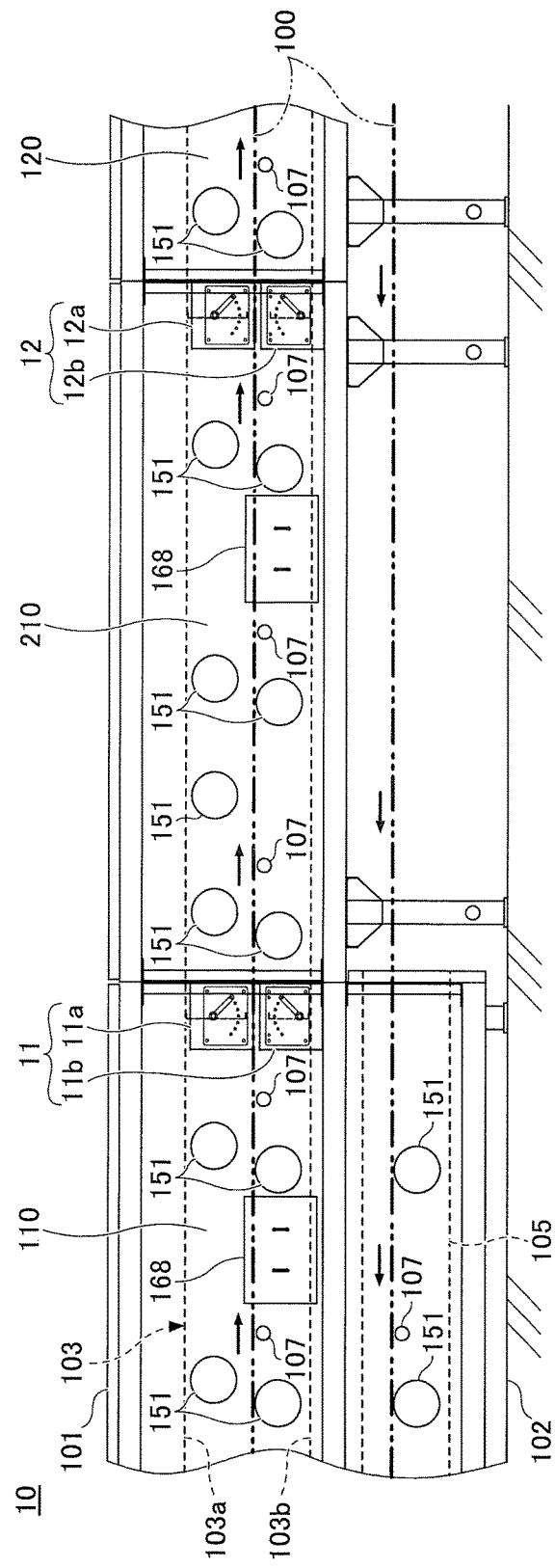

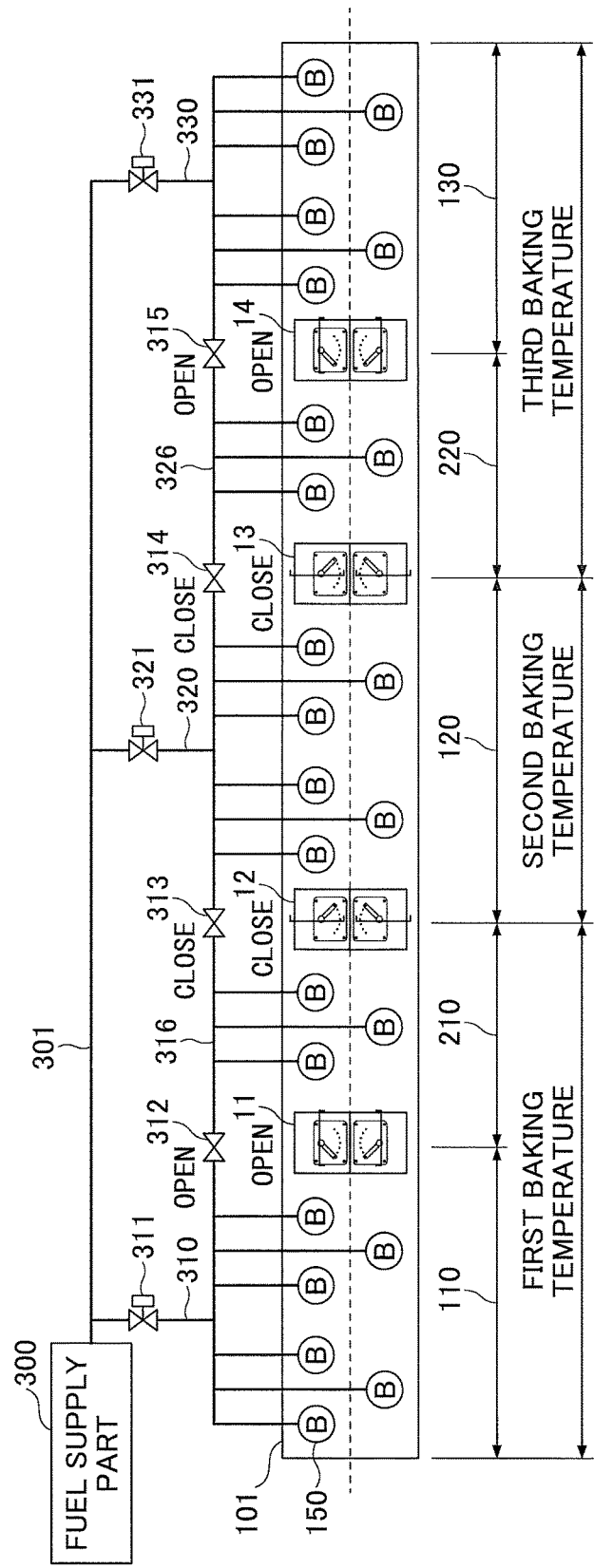

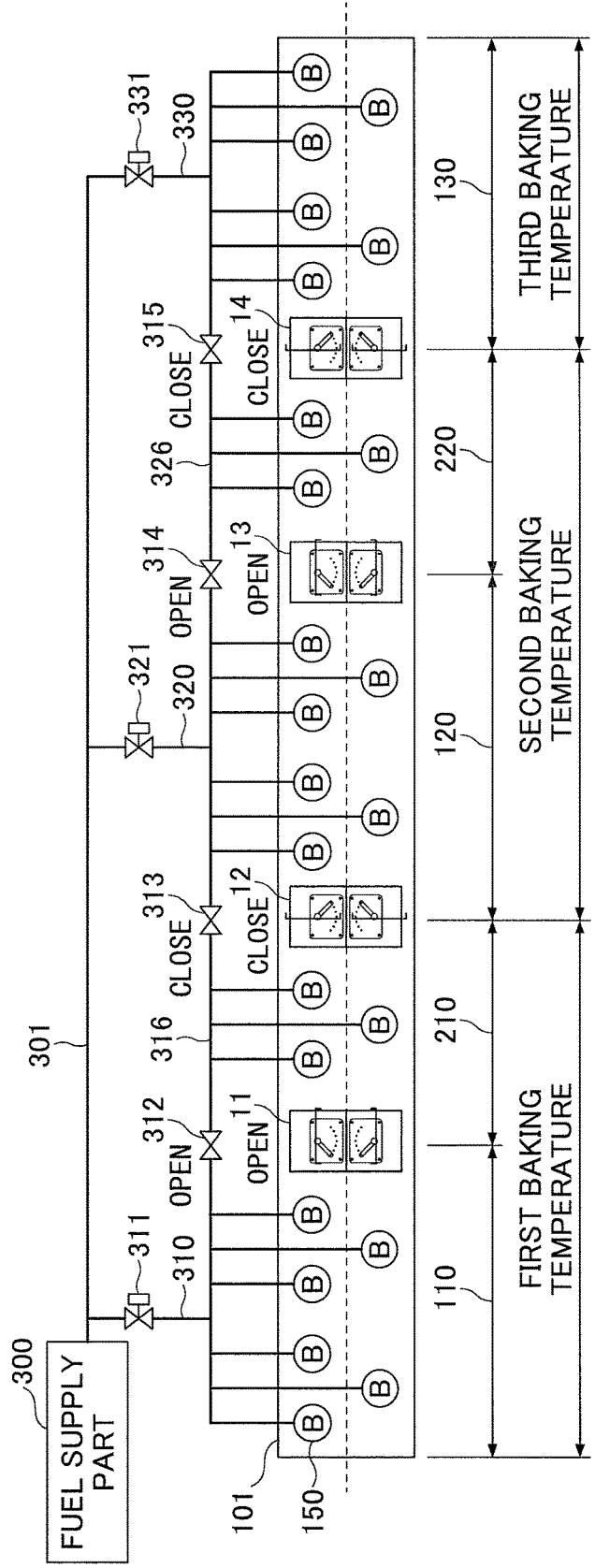

OVEN INCLUDING VARIABLE-LENGTH BAKING REGION

CROSS-REFERENCE TO RELATED APPLICATION

This application is based upon and claims the benefit of priority of Japanese Patent Application No. 2015-159563, filed on Aug. 12, 2015, the entire contents of which are incorporated herein by reference.

BACKGROUND OF THE INVENTION

1. Field of the Invention

The present invention relates to ovens.

2. Description of the Related Art

A tunnel oven capable of sequentially performing aging to baking of baked products such as bread and pastries is known. According to this tunnel oven, an aging chamber is partitioned by partitioning plates into multiple regions controlled to different temperatures, and products to be baked are conveyed to pass through the aging chamber and a baking chamber. (See, for example, Japanese Laid-Open Patent Application No. 10-248473.)

SUMMARY OF THE INVENTION

According to an aspect of the present invention, an oven includes a conveying part configured to convey a food material, a first region and a second region to perform a first baking process and a second baking process, respectively, on the conveyed food material, and an intermediate region between the first region and the second region. The oven further includes a movable first partition provided between the first region and the intermediate region and a movable second partition provided between the intermediate region and the second region. The intermediate region is added as a region to perform the first baking process to the first region in response to the first partition being opened and the second partition being closed. The intermediate region is added as a region to perform the second baking process to the second region in response to the first partition being closed and the second partition being opened.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 2A is an enlarged side view of part of the oven that includes a first intermediate region according to the embodiment;

FIGS. 5A through 5D are diagrams depicting patterns of controlling the oven according to the embodiment.

DETAILED DESCRIPTION OF THE PREFERRED EMBODIMENTS

Figure 1A:
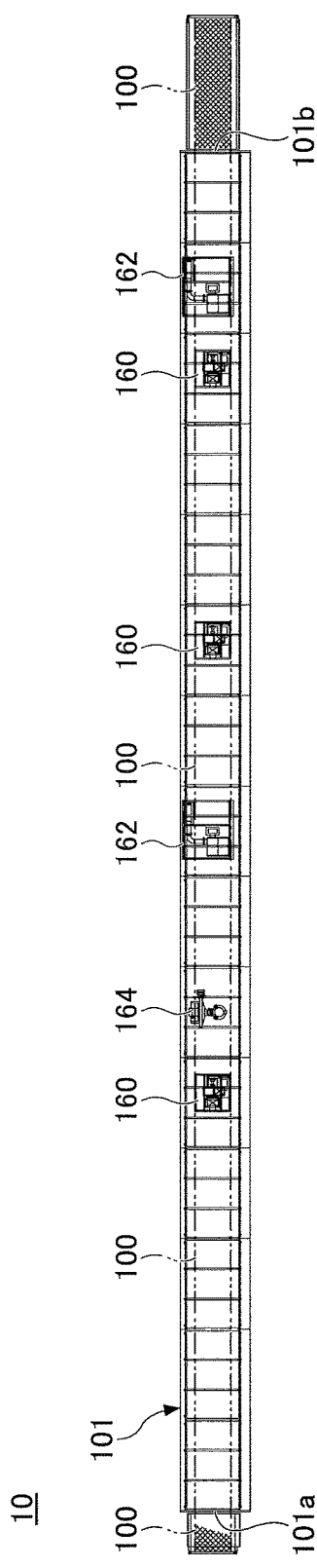
FIGS. 1A and 1B are diagrams depicting an oven according to an embodiment.

According to the tunnel oven described in Japanese Laid-Open Patent Application No. 10-248473, the partitioning plates are fixed. Therefore, it is not easy to change the length of a region to change an aging time. To change the length of a region in such a tunnel oven, a lot of work such as rearranging partitioning plates to positions corresponding to the length of the region to be changed, changing the temperature settings of the regions, and rearranging burning apparatuses may be required.

According to an aspect of the present invention, an oven in which the length of a region where a baking process for baking a food material is performed is easily changeable is provided.

One or more embodiments of the present invention are described below with reference to the accompanying drawings. In the following description, the same elements are referred to using the same reference numeral, and may not be repetitively described.

Figure 1B:
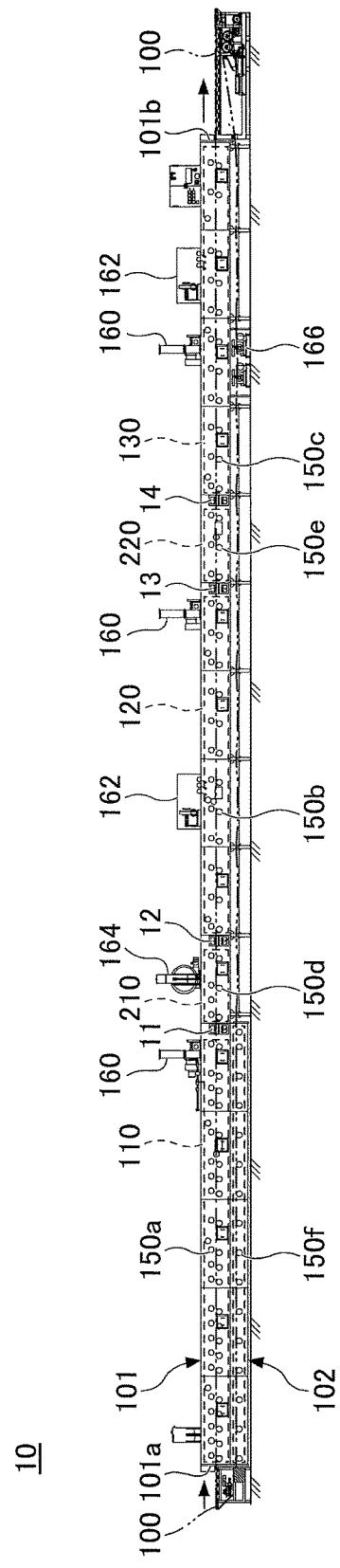

FIGS. 1A and 1B are schematic diagrams depicting a configuration of an oven 10 according to an embodiment. FIG. 1A is a plan view of the oven 10. FIG. 1B is a side view of the oven 10, in which an internal structure of the oven 10 is also depicted. In FIG. 1A, a depiction of some parts of the oven 10 depicted in FIG. 1B is omitted.

The oven 10 includes a conveyor belt 100, a baking chamber 101, and a pre-heating chamber 102. The conveyor belt 100 serves as a conveying part that conveys, along a conveyance path, a food material for food products that are finished through a baking process, such as bread or pastries. The conveyor belt 100 carrying the food material passes through the baking chamber 101. The conveyor belt 100 before carrying the food material is heated in the pre-heating chamber 102. The baking chamber 101 includes an upstream end 101a and a downstream end 101b.

The food material, while being conveyed in the baking chamber 101 from the upstream end 101a to the downstream end 101b by the conveyor belt 100, comes closer to finished products as baking progresses. Therefore, the condition of the food material at the upstream end 101a differs from the condition of the food material at the downstream end 101b. According to this embodiment, however, the food material refers to a food material conveyed from the upstream end 101a to the downstream end 101b of the baking chamber 101. The food material may be in the form of finished products or in a state before being further subjected to another process, when the food material is taken out from the baking chamber 101.

The conveyor belt 100 is an endless belt wrapped around a rotating drive roller and support rollers 107 (FIGS. 2A and 2B) to be driven to rotate by the drive roller. The conveyor belt 100 is provided to rotate in a clockwise direction in FIG. 1B. Multiple pieces of the food material are placed at predetermined intervals on the upper surface of the conveyor belt 100. The food material placed on the conveyor belt 100 is conveyed by the rotating conveyor belt 100 to pass through the baking chamber 101 from left to right in FIGS. 1A and 1B. The food material is heated while being conveyed through the baking chamber 101 by the conveyor belt 100. The food material is baked up when conveyed out of the baking chamber 101.

The baking chamber 101 includes a first region 110, a first intermediate region 210, a second region 120, a second intermediate region 220, and a third region 130, which are arranged in this order in a conveying direction in which the food material is conveyed by the conveyor belt 100.

Gas burners 150*a*, which serve as burning apparatuses, are provided on each of the upper side (outer surface side) and the lower side (inner surface side) of the conveyor belt 100 in the first region 110. The first region 110 is heated to a first temperature by the gas burners 150*a* to subject the food material conveyed by the conveyor belt 100 to a first baking process.

As in the first region 110, gas burners 150*b* are provided on each of the upper side and the lower side of the conveyor belt 100 in the second region 120. The second region 120 is heated to a second temperature by the gas burners 150*b* to subject the food material conveyed by the conveyor belt 100 to a second baking process.

Like in the first region 110 and the second region 120, gas burners 150*c* are provided on each of the upper side and the lower side of the conveyor belt 100 in the third region 130. The third region 130 is heated to a third temperature by the gas burners 150*c* to subject the food material conveyed by the conveyor belt 100 to a third baking process.

The first intermediate region 210 is formed between the first region 110 and the second region 120. Gas burners 150*d* are provided on each of the upper side and the lower side of the conveyor belt 100 in the first intermediate region 210.

A movable first partition 11 is provided between the first region 110 and the first intermediate region 210. A movable second partition 12 is provided between the first intermediate region 210 and the second region 120.

When the first partition 11 is opened and the second partition 12 is closed, the first intermediate region 210 communicates with the first region 110 to serve, together with the first region 110, as a region in which the first baking process is performed. When the first partition 11 is closed and the second partition 12 is opened, the first intermediate region 210 communicates with the second region 120 to serve, together with the second region 120, as a region in which the second baking process is performed.

The second intermediate region 220 is formed between the second region 120 and the third region 130. Gas burners 150*e* are provided on each of the upper side and the lower side of the conveyor belt 100 in the second intermediate region 220.

A movable third partition 13 is provided between the second region 120 and the second intermediate region 220. A movable fourth partition 14 is provided between the second intermediate region 220 and the third region 130.

When the third partition 13 is opened and the fourth partition 14 is closed, the second intermediate region 220 communicates with the second region 120 to serve, together with the second region 120, as a region in which the second baking process is performed. When the third partition 13 is closed and the fourth partition 14 is opened, the second intermediate region 220 communicates with the third region 130 to serve, together with the third region 130, as a region in which the third baking process is performed.

The pre-heating chamber 102 is provided below the baking chamber 101 to pre-heat the conveyor belt 100 before carrying the food material with gas burners 150*f*. The pre-heating chamber 102 is provided outside the baking chamber 101 to cover at least part of the conveyor belt 100.

The pre-heating chamber 102 heats the conveyor belt 100 before carrying the food material to quickly heat the food material in the first baking process in the first region 110 of the baking chamber 101. The pre-heating chamber 102 is preferably provided immediately upstream of a position at which the food material is loaded onto the conveyor belt 100 to prevent a decrease in the temperature of the heated conveyor belt 100.

The oven 10 further includes exhaust fans 160, convection fans 162, a combustion blower 164, and a cleaning brush 166, which may be suitably provided in accordance with the configuration of the baking chamber 101 and of which arrangement and numbers are not limited to those illustrated in this embodiment.

According to this embodiment, the oven 10 includes two intermediate regions that are separated from adjacent regions by partitions, namely, the first intermediate region 210 and the second intermediate region 220. The number of intermediate regions, however, is not limited to this. For example, the oven 10 may include the first intermediate region 210 or the second intermediate region 220 as an intermediate region. In this case, two regions in which different baking processes are performed are separated by the intermediate region to be formed in the baking chamber 101. Furthermore, in addition to the first intermediate region 210 and the second intermediate region 220, one or more intermediate regions may be further provided on the downstream side of the second intermediate region 220. In this case, four or more regions in which different baking processes are performed are separated by the intermediate regions to be formed in the baking chamber 101.

Furthermore, the conveying part provided in the oven 10 is not limited to a belt conveyor that includes the conveyor belt 100 illustrated in this embodiment, and may be, for example, a roller conveyor.

Next, configurations of the intermediate regions and partitions provided in the baking chamber 101 are described.

Figure 2B:
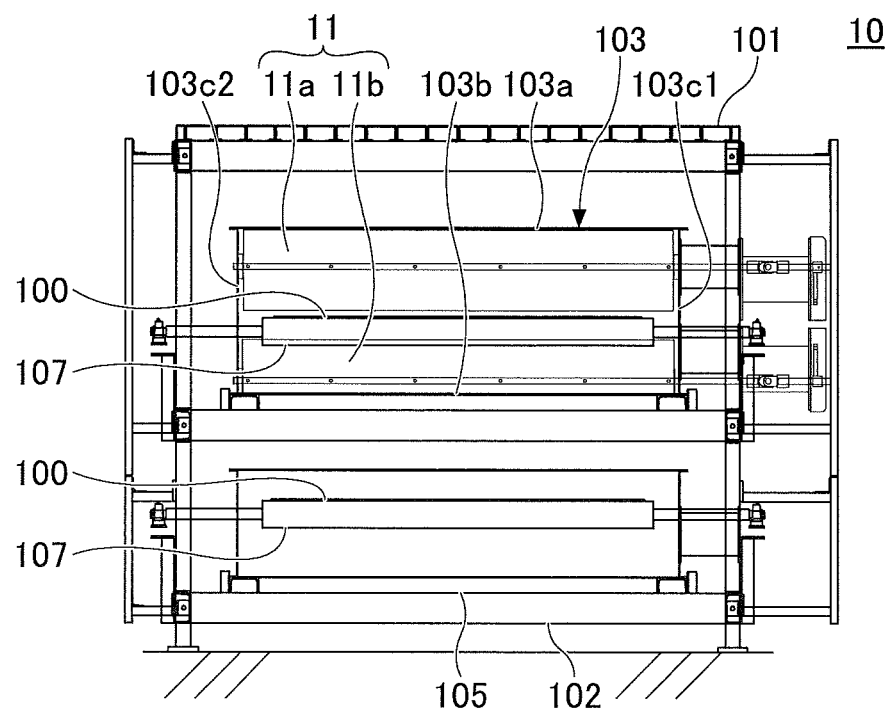
FIG. 2B is an enlarged front view of the oven according to the embodiment.

FIG. 2A is a schematic enlarged side view of part of the oven 10 that includes the first intermediate region 210. FIG. 23 is a schematic enlarged front view of the oven 10. In FIGS. 2A and 2B, a depiction of the gas burners 150*a* through 150*f* is omitted, and attachment openings 151 to which the gas burners 150*a* through 150*f* are attached are depicted instead of the gas burners 150*a* through 150*f* in FIG. 2A.

Referring to FIGS. 2A and 2B, the baking chamber 101 includes a passage 103 through which the conveyor belt 100, which rotates in a direction indicated by arrows in FIG. 2A, passes. Referring to FIG. 2B, the passage 103 includes a ceiling 103*a*, a bottom 103*b*, and first and second sides 103*c*1 and 103*c*2 to surround the conveyor belt 100. In addition to the attachment openings 151, inspection openings 168 for inspecting the interior of the baking chamber 101 are provided in the first side 103*c*1 of the passage 103. The support rollers 107 that support the conveyor belt 100 are rotatably supported by the first and second sides 103*c*1 and 103*c*2 of the passage 103.

The pre-heating chamber 102 includes a passage 105 through which the conveyor belt 100 passes. Like in the passage 103 of the baking chamber 101, the attachment openings 151 are provided and the support rollers 107 are rotatably supported in the passage 105.

The passage 103 of the baking chamber 101 is separated into the first region 110 and the first intermediate region 210 by the first partition 11. Furthermore, the passage 103 of the baking chamber 101 is separated into the first intermediate region 210 and the second region 120 by the second partition 12.

The first partition 11 includes a first upper partition 11a and a first lower partition 11b provided on the upper side and the lower side, respectively, of the conveyor belt 100. The first upper partition 11a and the first lower partition 11b include respective movable partitioning plates that are rotatably provided. According to the first partition 11, the movable partitioning plates of the first upper partition 11a and the first lower partition 11b rotate to open or close the first partition 11 between the first region 110 and the first intermediate region 210.

Like the first partition 11, the second partition 12 includes a second upper partition 12a and a second lower partition 12b provided on the upper side and the lower side, respectively, of the conveyor belt 100. The second upper partition 12a and the second lower partition 12b include respective movable partitioning plates that are rotatably provided. According to the second partition 12, the movable partitioning plates of the second upper partition 12a and the second lower partition 12b rotate to open or close the second partition 12 between the first intermediate region 210 and the second region 120.

When the first partition 11 is opened and the second partition 12 is closed, the first intermediate region 210 communicates with the first region 110 while the communication between the first intermediate region 210 and the second region 120 is closed. When the first partition 11 is closed and the second partition 12 is opened, the communication between the first intermediate region 210 and the first region 110 is closed while the first intermediate region 210 communicates with the second region 120.

Next, a configuration of partitions that partition the passage 103 in the baking chamber 101 is described.

Figure 3A:
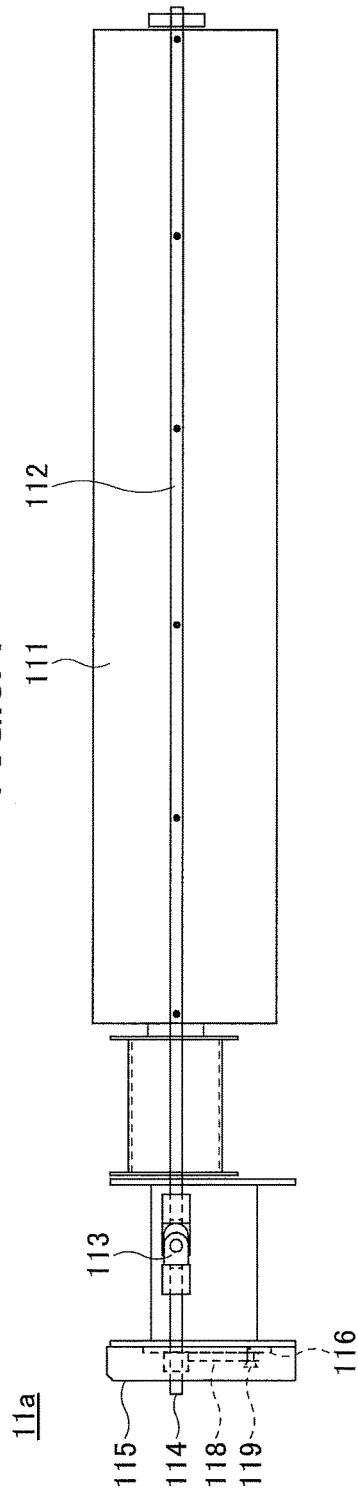
FIGS. 3A and 3B are diagrams depicting a partition according to the embodiment.
Figure 3B:
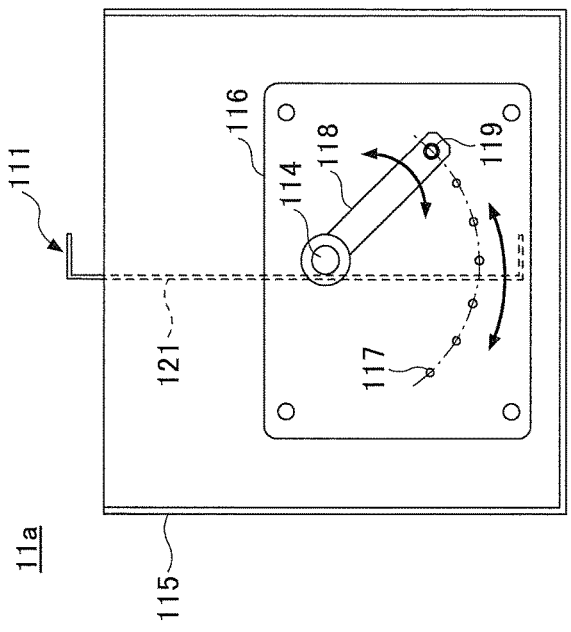

FIGS. 3A and 3B are a side view and a front view, respectively, of the first upper partition 11a.

Referring to FIGS. 3A and 3B, the first upper partition 11a includes a movable partitioning plate 111, a rotating shaft 112, a joint 113, a handle shaft 114, an operation plate 115, a handle fixation plate 116, a handle 118, and a fixing pin 119.

The movable partitioning plate 111 is a rectangular plate member formed of, for example, steel. Referring to FIG. 3B, the movable partitioning plate 111 has an upper end and a lower end bent in the same direction. The movable partitioning plate 111 is fixed to the rotating shaft 112.

The rotating shaft 112 is rotatably supported in the baking chamber 101 so that the axial direction of the rotating shaft 112 is parallel to the width direction of the conveyor belt 100. The width direction of the conveyor belt 100 is a direction parallel to the outer surface of the conveyor belt 100 on which the food material is placed and perpendicular to a direction in which the conveyor belt 100 moves to rotate.

The handle shaft 114 has a first end coupled to an end of the rotating shaft 112 by the joint 113. The operation plate 115 and the handle fixation plate 116 are attached in layers to an exterior wall of the baking chamber 101. The handle shaft 114 pierces through the operation plate 115 and the handle fixation plate 116.

The handle 118 is fixed to a second end of the handle shaft 114 to be rotatable in directions indicated by a double-headed arrow in FIG. 33. When the handle 118 is turned, the rotating shaft 112 rotates together with the handle 118 to rotate the movable partitioning plate 111 fixed to the rotating shaft 112. Thus, the movable partitioning plate 111 rotates about the rotating shaft 112.

The handle fixation plate 116 includes multiple handle fixing holes 117 in a region through which the handle 118 passes. The handle fixing holes 117 are formed at predetermined angular intervals on an arc of a circle centering on the handle shaft 114. The fixing pin 119 is inserted into one of the handle fixing holes 117 through a through hole provided in an end of the handle 118 so that the handle 118 is fixed to the handle fixation plate 116 to keep a predetermined angle.

According to this embodiment, seven handle fixing holes 117 are provided at intervals of 15 degrees. As depicted in FIG. 3B, when the handle 118 is turned counterclockwise to be fixed to the rightmost handle fixing hole 117, a principal surface 121 of the movable partitioning plate 111 is perpendicular to the outer surface of the conveyor belt 100. Furthermore, when the handle 118 is turned clockwise to be fixed to the leftmost handle fixing hole 117, the principal surface 121 of the movable partitioning plate 111 is parallel to the outer surface of the conveyor belt 100. It is also possible to incline the principal surface 121 of the movable partitioning plate 111 to the outer surface of the conveyor belt 100 by changing the position at which the handle 118 is fixed.

The first lower partition 11b has the same configuration as the first upper partition 11a, and includes a movable partitioning plate rotated by a handle operation. According to the first partition 11, as depicted in FIGS. 2A and 2B, the first upper partition 11a and the first lower partition 11b having the same configuration are provided to face each other vertically across the conveyor belt 100.

By operating the movable partitioning plates of the first upper partition 11a and the first lower partition 11b so that the principal surfaces of the movable partitioning plates are perpendicular to the outer surface of the conveyor belt 100, it is possible to close the first partition 11 to separate the first region 110 and the first intermediate region 210.

By operating the movable partitioning plates of the first upper partition 11a and the first lower partition 11b so that the principal surfaces of the movable partitioning plates are parallel to the outer surface of the conveyor belt 100, it is possible to open the first partition 11 to cause the first region 110 to communicate with the first intermediate region 210.

Furthermore, by operating the movable partitioning plates of the first upper partition 11a and the first lower partition 11b so that the principal surfaces of the movable partitioning plates are inclined to the outer surface of the conveyor belt 100, it is possible to set the first partition 11 to an intermediate state between the open state and the closed state.

As described above, by operating a pair of movable partitioning plates formed of the movable partitioning plate 111 of the first upper partition 11a and the movable partitioning plate of the first lower partition 11b, the first partition 11 is closed to separate the first region 110 and the first intermediate region 210 or opened to cause the first region 110 to communicate with the first intermediate region 210.

By way of example, a configuration of the first partition 11 is described above. The second partition 12, the third partition 13, and the fourth partition 14 provided in the oven 10 have the same configuration as the first partition 11. Each of the second partition 12, the third partition 13, and the fourth partition 14 has the same movable partitioning plates as those of the first partition 11, and has the movable partitioning plates operated to separate adjacent regions or cause adjacent regions to communicate with each other.

A partition that separates regions in the oven 10 is not limited to the configuration illustrated in this embodiment as long as the partition can open and close the passage 103 of the baking chamber 101.

Next, a configuration including a fuel supply part that supplies fuel to the gas burners 150a through 150e provided in the regions of the baking chamber 101 is described. In the following description, the gas burners 150a through 150e may be collectively referred to as "gas burners 150."

Figure 4:
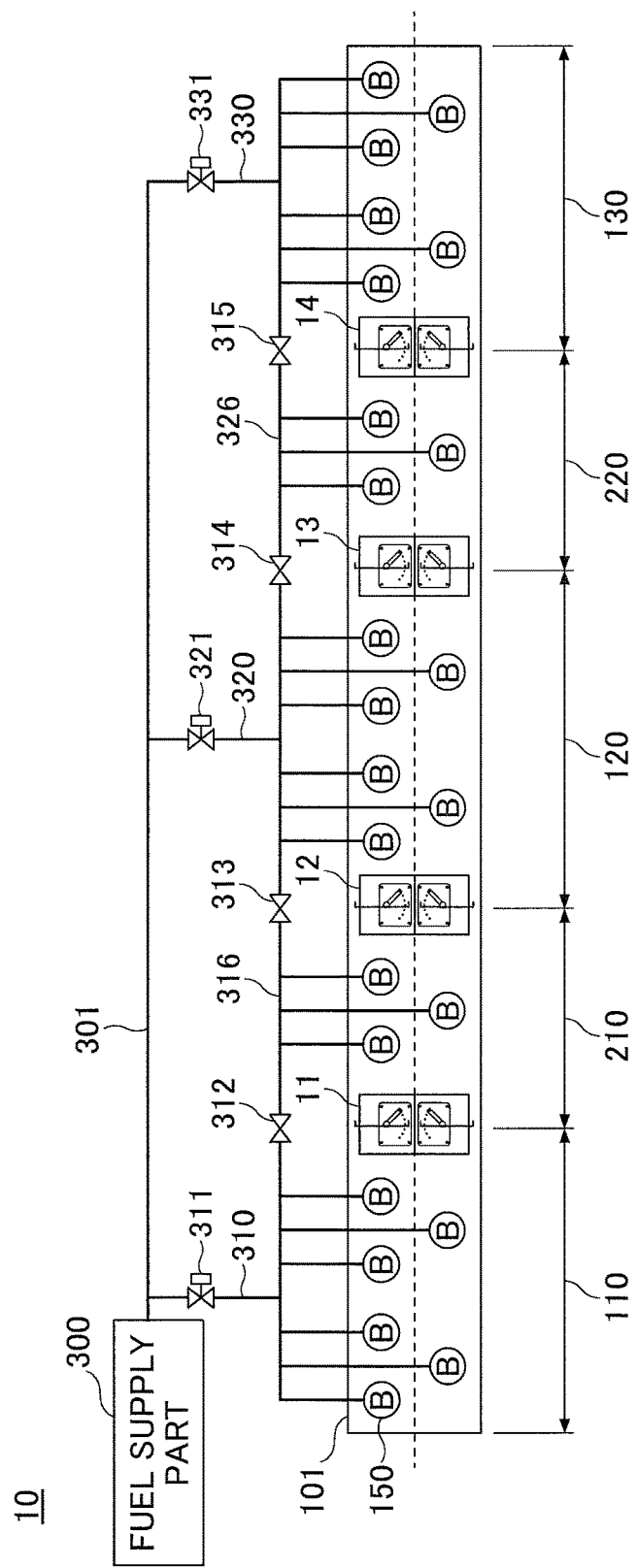
FIG. 4 is a diagram depicting a configuration of the oven including a fuel supply part according to the embodiment.

FIG. 4 is a schematic diagram depicting a configuration of the oven 10 including a fuel supply part 300 according to the embodiment.

Referring to FIG. 4, the baking chamber 101 of the oven 10 includes the first region 110, the first intermediate region 210, the second region 120, the second intermediate region 220, and the third region 130. The first partition 11 is provided between the first region 110 and the first intermediate region 210. The second partition 12 is provided between the first intermediate region 210 and the second region 120. The third partition 13 is provided between the second region 120 and the second intermediate region 220. The fourth partition 14 is provided between the second intermediate region 220 and the third region 130.

Furthermore, according to the oven 10, the gas burners 150 are provided in the baking chamber 101. Each of the first region 110, the first intermediate region 210, the second region 120, the second intermediate region 220, and the third region 130 is provided with at least one of the gas burners 150. The gas burners 150 burn supplied fuel gas to heat the interior of the baking chamber 101.

Referring to FIG. 4, the oven 10 includes the fuel supply part 300, a fuel supply channel 301, a first supply channel 310, a second supply channel 320, a third supply channel 330, a first intermediate channel 316, and a second intermediate channel 326 to supply fuel gas to the gas burners 150.

The fuel supply part 300 supplies fuel gas to the fuel supply channel 301. The first supply channel 310 is connected to the fuel supply channel 301 to supply fuel gas to the gas burners 150 provided in the first region 110. The first supply channel 310 includes a first control valve 311. The first control valve 311 controls the amount of fuel gas supplied from the fuel supply channel 301 to the gas burners 150 provided in the first region 110 to maintain the first region 110 at a first temperature.

The second supply channel 320 is connected to the fuel supply channel 301 to supply fuel gas to the gas burners 150 provided in the second region 120. The second supply channel 320 includes a second control valve 321. The second control valve 321 controls the amount of fuel gas supplied from the fuel supply channel 301 to the gas burners 150 provided in the second region 120 to maintain the second region 120 at a second temperature.

The third supply channel 330 is connected to the fuel supply channel 301 to supply fuel gas to the gas burners 150 provided in the third region 130. The third supply channel 330 includes a third control valve 331. The third control valve 331 controls the amount of fuel gas supplied from the fuel supply channel 301 to the gas burners 150 provided in the third region 130 to maintain the third region 130 at a third temperature.

The first intermediate channel 316 supplies fuel gas to the gas burners 150 provided in the first intermediate region 210. The first intermediate channel 316 is connected to the first supply channel 310 by a first opening and closing valve 312. The first intermediate channel 316 is connected to the second supply channel 320 by a second opening and closing valve 313.

By opening the first opening and closing valve 312 and closing the second opening and closing valve 312 to connect the first intermediate channel 316 to the first supply channel 310, it is possible to supply the gas burners 150 provided in the first region 110 and the first intermediate region 210 with the same amount of fuel gas. By closing the first opening and closing valve 312 and opening the second opening and closing valve 312 to connect the first intermediate channel 316 to the second supply channel 320, it is possible to supply the gas burners 150 provided in the first intermediate region 210 and the second region 120 with the same amount of fuel gas.

Thus, by opening or closing the first opening and closing valve 312 and the second opening and closing valve 313 serving as switch parts, it is possible to switch the connection destination of the first intermediate channel 316 between the first supply channel 310 and the second supply channel 320.

The second intermediate channel 326 supplies fuel gas to the gas burners 150 provided in the second intermediate region 220. The second intermediate channel 326 is connected to the second supply channel 320 by a third opening and closing valve 314. The second intermediate channel 326 is connected to the third supply channel 330 by a fourth opening and closing valve 315.

By opening the third opening and closing valve 314 and closing the fourth opening and closing valve 315 to connect the second intermediate channel 326 to the second supply channel 320, it is possible to supply the gas burners 150 provided in the second region 120 and the second intermediate region 220 with the same amount of fuel gas. By closing the third opening and closing valve 314 and opening the fourth opening and closing valve 315 to connect the second intermediate channel 326 to the third supply channel 330, it is possible to supply the gas burners 150 provided in the second intermediate region 220 and the third region 130 with the same amount of fuel gas.

Thus, by opening or closing the third opening and closing valve 314 and the fourth opening and closing valve 315 serving as switch parts, it is possible to switch the connection destination of the second intermediate channel 326 between the second supply channel 320 and the third supply channel 330.

As described above, according to the oven 10, fuel gas is supplied from the fuel supply part 300 to the gas burners 150 provided in the first region 110, the first intermediate region 210, the second region 120, the second intermediate region 220, and the third region 130 through the first supply channel 310, the second supply channel 320, the third supply channel 330, the first intermediate channel 316, and the second intermediate channel 326. The amount of fuel gas supplied to the gas burners 150 is controlled by the first control valve 311 serving as a first control part and by the second control valve 321 and the third control valve 331 serving as a second control part to maintain the first region 110, the first intermediate region 210, the second region 120, the second intermediate region 220, and the third region 130 at predetermined temperatures. The amount of burning may be controlled with respect to each of the gas burners 150 to make it possible to perform fine temperature control.

The gas burners 150f provided in the pre-heating chamber 102 are supplied with fuel gas from the fuel supply part 300 through a fuel supply channel (not depicted in FIG. 4). The gas burners 150f provided in the pre-heating chamber 102 burn the supplied fuel gas to heat the interior of the preheating chamber 102 to a predetermined temperature.

Next, control of each part of the oven 10 is described.

FIGS. 5A through 5D are diagrams depicting different examples of control of the oven 10 according to the embodiment.

Control Example 1

Figure 5A:
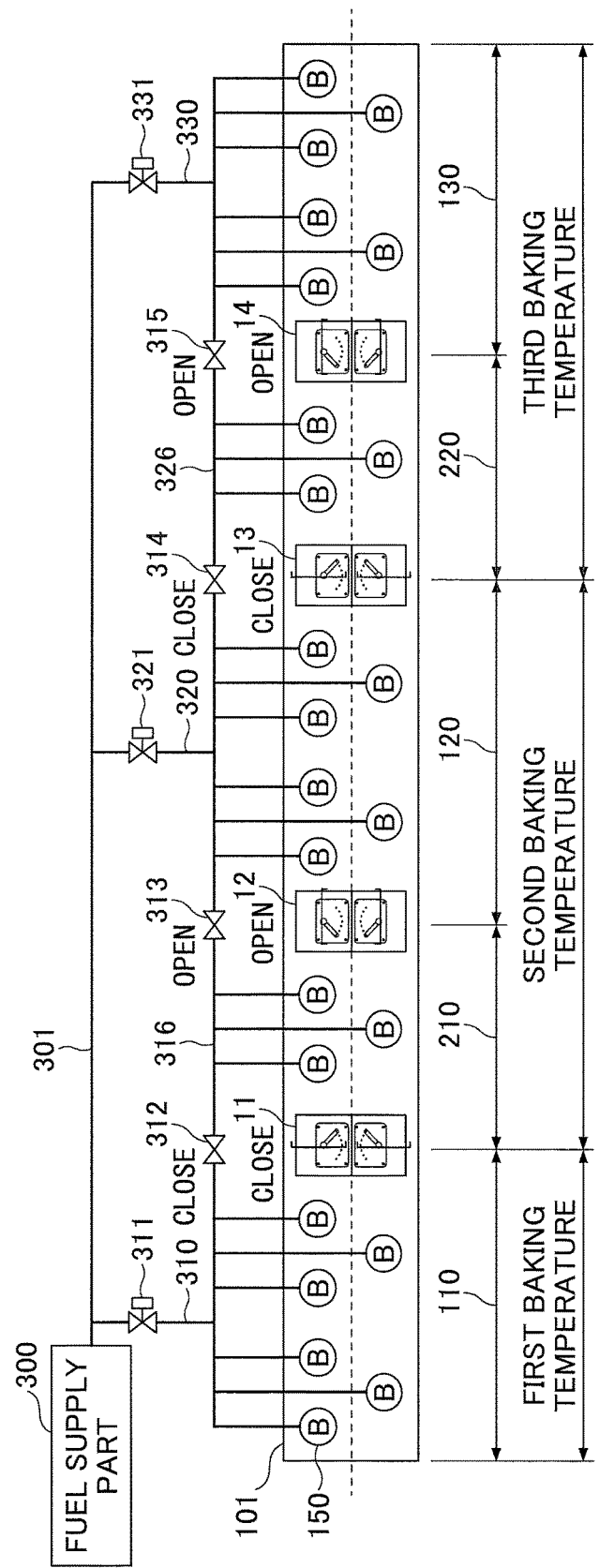

According to Control Example 1 depicted in FIG. 5A, the first partition 11 is closed and the second partition 12 is opened to separate the first region 110 and the first intermediate region 210 and cause the first intermediate region 210 to communicate with the second region 120.

Furthermore, the first opening and closing valve 312 is closed and the second opening and closing valve 313 is opened to connect the first intermediate channel 316 to the second supply channel 320. Like the gas burners 150 provided in the second region 120, the gas burners 150 provided in the first intermediate region 210 are supplied with fuel gas whose amount of supply is controlled by the second control valve 321.

By controlling the oven 10 as described above, it is possible to cause the first intermediate region 210 to communicate with the second region 120 and heat the first intermediate region 210 to the second (baking) temperature the same as the second region 120. Thus, it is possible to add the first intermediate region 210 to the second region 120 as a region in which the second baking process is performed.

Furthermore, according to Control Example 1, the third partition 13 is closed and the fourth partition is opened to separate the second region 120 and the second intermediate region 220 and cause the second intermediate region 220 to communicate with the third region 130.

Furthermore, the third opening and closing valve 314 is closed and the fourth opening and closing valve 315 is opened to connect the second intermediate channel 326 to the third supply channel 330. Like the gas burners 150 provided in the third region 130, the gas burners 150 provided in the second intermediate region 220 are supplied with fuel gas whose amount of supply is controlled by the third control valve 331.

By controlling the oven 10 as described above, it is possible to cause the second intermediate region 220 to communicate with the third region 130 and heat the second intermediate region 220 to the third (baking) temperature the same as the third region 130. Thus, it is possible to add the second intermediate region 220 to the third region 130 as a region in which the third baking process is performed.

As described above, according to Control Example 1, the first intermediate region 210 is added to the second region 120 as a region in which the second baking process is performed, so that the second baking process to heat the food material at the second temperature is extended. Furthermore, the second intermediate region 220 is added to the third region 130 as a region in which the third baking process is performed, so that the third baking process to heat the food material at the third temperature is extended.

Control Example 2

According to Control Example 2 depicted in FIG. 5B, the first partition 11 is opened and the second partition 12 is closed to separate the first intermediate region 210 and the second region 120 and cause the first intermediate region 210 to communicate with the first region 110.

Furthermore, the first opening and closing valve 312 is opened and the second opening and closing valve 313 is closed to connect the first intermediate channel 316 to the first supply channel 310. Like the gas burners 150 provided in the first region 110, the gas burners 150 provided in the first intermediate region 210 are supplied with fuel gas whose amount of supply is controlled by the first control valve 311.

By controlling the oven 10 as described above, it is possible to cause the first intermediate region 210 to communicate with the first region 110 and heat the first intermediate region 210 to the first (baking) temperature the same as the first region 110. Thus, it is possible to add the first intermediate region 210 to the first region 110 as a region in which the first baking process is performed.

Furthermore, according to Control Example 2, the third partition 13 is closed and the fourth partition is opened to separate the second region 120 and the second intermediate region 220 and cause the second intermediate region 220 to communicate with the third region 130.

Furthermore, the third opening and closing valve 314 is closed and the fourth opening and closing valve 315 is opened to connect the second intermediate channel 326 to the third supply channel 330. Like the gas burners 150 provided in the third region 130, the gas burners 150 provided in the second intermediate region 220 are supplied with fuel gas whose amount of supply is controlled by the third control valve 331.

By controlling the oven 10 as described above, it is possible to cause the second intermediate region 220 to communicate with the third region 130 and heat the second intermediate region 220 to the third temperature the same as the third region 130. Thus, it is possible to add the second intermediate region 220 to the third region 130 as a region in which the third baking process is performed.

As described above, according to Control Example 2, the first intermediate region 210 is added to the first region 110 as a region in which the first baking process is performed, so that the first baking process to heat the food material at the first temperature is extended. Furthermore, the second intermediate region 220 is added to the third region 130 as a region in which the third baking process is performed, so that the third baking process to heat the food material at the third temperature is extended.

Control Example 3

According to Control Example 3 depicted in FIG. 5C, the first partition 11 is opened and the second partition 12 is closed to separate the first intermediate region 210 and the second region 120 and cause the first intermediate region 210 to communicate with the first region 110.

Furthermore, the first opening and closing valve 312 is opened and the second opening and closing valve 313 is closed to connect the first intermediate channel 316 to the first supply channel 310. Like the gas burners 150 provided in the first region 110, the gas burners 150 provided in the first intermediate region 210 are supplied with fuel gas whose amount of supply is controlled by the first control valve 311.

By controlling the oven 10 as described above, it is possible to cause the first intermediate region 210 to communicate with the first region 110 and heat the first intermediate region 210 to the first temperature the same as the first region 110. Thus, it is possible to add the first intermediate region 210 to the first region 110 as a region in which the first baking process is performed.

Furthermore, according to Control Example 3, the third partition 13 is opened and the fourth partition is closed to separate the second intermediate region 220 and the third region 130 and cause the second intermediate region 220 to communicate with the second region 120.

Furthermore, the third opening and closing valve 314 is opened and the fourth opening and closing valve 315 is closed to connect the second intermediate channel 326 to the second supply channel 320. Like the gas burners 150 provided in the second region 120, the gas burners 150 provided in the second intermediate region 220 are supplied with fuel gas whose amount of supply is controlled by the second control valve 321.

By controlling the oven 10 as described above, it is possible to cause the second intermediate region 220 to communicate with the second region 120 and heat the second intermediate region 220 to the second temperature the same as the second region 120. Thus, it is possible to add the second intermediate region 220 to the second region 120 as a region in which the second baking process is performed.

As described above, according to Control Example 3, the first intermediate region 210 is added to the first region 110 as a region in which the first baking process is performed, so that the first baking process to heat the food material at the first temperature is extended. Furthermore, the second intermediate region 220 is added to the second region 120 as a region in which the second baking process is performed, so that the second baking process to heat the food material at the second temperature is extended.

Control Example 4

Figure 5D:
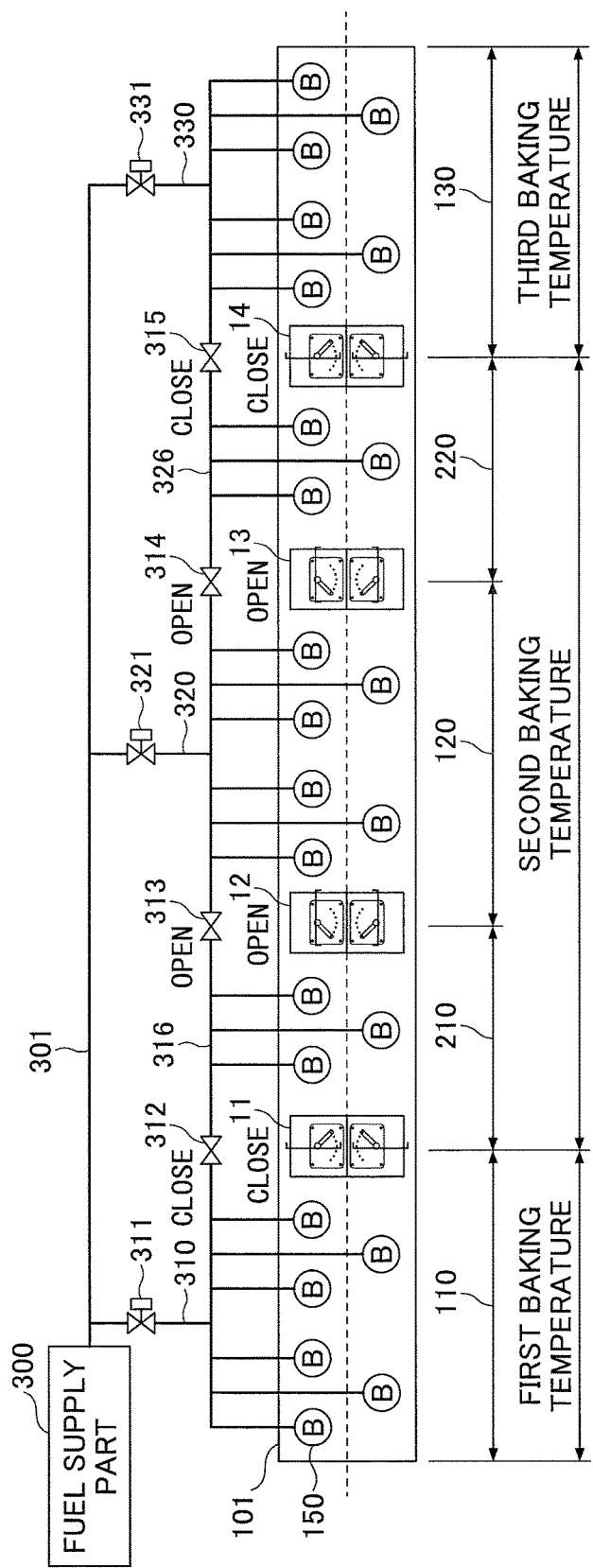

According to Control Example 4 depicted in FIG. 5D, the first partition 11 is closed and the second partition 12 is opened to separate the first region 110 and the first intermediate region 210 and cause the first intermediate region 210 to communicate with the second region 120.

Furthermore, the first opening and closing valve 312 is closed and the second opening and closing valve 313 is opened to connect the first intermediate channel 316 to the second supply channel 320. Like the gas burners 150 provided in the second region 120, the gas burners 150 provided in the first intermediate region 210 are supplied with fuel gas whose amount of supply is controlled by the second control valve 321.

By controlling the oven 10 as described above, it is possible to cause the first intermediate region 210 to communicate with the second region 120 and heat the first intermediate region 210 to the second temperature the same as the second region 120. Thus, it is possible to add the first intermediate region 210 to the second region 120 as a region in which the second baking process is performed.

Furthermore, according to Control Example 4, the third partition 13 is opened and the fourth partition is closed to separate the second intermediate region 220 and the third region 130 and cause the second intermediate region 220 to communicate with the second region 120.

Furthermore, the third opening and closing valve 314 is opened and the fourth opening and closing valve 315 is closed to connect the second intermediate channel 326 to the second supply channel 320. Like the gas burners 150 provided in the second region 120, the gas burners 150 provided in the second intermediate region 220 are supplied with fuel gas whose amount of supply is controlled by the second control valve 321.

By controlling the oven 10 as described above, it is possible to cause the second intermediate region 220 to communicate with the second region 120 and heat the second intermediate region 220 to the second temperature the same as the second region 120. Thus, it is possible to add the second intermediate region 220 to the second region 120 as a region in which the second baking process is performed.

As described above, according to Control Example 4, the first intermediate region 210 and the second intermediate region 220 are added to the second region 120 as a region in which the second baking process is performed, so that the second baking process to heat the food material at the second temperature is extended.

As illustrated in Control Examples 1 through 4 described above, by controlling the opening and closing of the first partition 11, the second partition 12, the first opening and closing valve 312, and the second opening and closing valve 313 to add the first intermediate region 210 to the first region 110 or the second region 120, it is possible to extend the first baking process or the second baking process. Furthermore, by controlling the opening and closing of the third partition 13, the fourth partition 14, the third opening and closing valve 314, and the fourth opening and closing valve 315 to add the second intermediate region 220 to the second region 120 or the third region 130, it is possible to extend the second baking process or the third baking process.

The control of the partitions and the opening and closing valves provided in the oven 10 is not limited to Control Examples 1 through 4 described above. For example, the first partition 11 and the second partition 12 may be opened to cause the first region 110, the first intermediate region 210, and the second region 120 to communicate with one another. In this case, the first opening and closing valve 312 and the second opening and closing valve 313 may be opened and the amount of fuel gas supplied may be controlled with the first control valve 311 and the second control valve 321 to heat the first region 110, the first intermediate region 210, and the second region 120 to the same temperature to perform a single baking process.

Furthermore, for example, the third partition 13 and the fourth partition 14 may be opened to cause the second region 120, the second intermediate region 220, and the third region 130 to communicate with one another. In this case, the third opening and closing valve 314 and the fourth opening and closing valve 315 may be opened and the amount of fuel gas supplied may be controlled with the second control valve 321 and the third control valve 331 to heat the second region 120, the second intermediate region 220, and the third region 130 to the same temperature to perform a single baking process.

As described above, according to the oven 10, movable partitioning plates can be opened or closed to change the lengths of regions to be heated to different temperatures. Therefore, the oven 10 can change the lengths of regions without troublesome work such as changing the positions of fixed partitioning plates to optimize a baking time to be used for a variety of food materials.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. An oven has been described in detail based on one or more embodiments of the present invention. It should be understood, however, that various changes, substitutions, and alterations could be made hereto without departing from the spirit and scope of the invention.

What is claimed is:

1. An oven, comprising:
a conveying part configured to convey a food material;
a first region to perform a first baking process on the conveyed food material;
a second region to perform a second baking process on the conveyed food material;
an intermediate region between the first region and the second region;
a movable first partition provided between the first region and the intermediate region;
a movable second partition provided between the intermediate region and the second region;
a fuel supply part configured to supply fuel;
a first supply channel connected to the fuel supply part to supply the fuel to a burning apparatus in the first region;
a first control part provided in the first supply channel and configured to control an amount of the fuel supplied from the fuel supply part to the first supply channel to maintain the first region at a first temperature;
a second supply channel connected to the fuel supply part to supply the fuel to a burning apparatus in the second region;
a second control part provided in the second supply channel and configured to control an amount of the fuel supplied from the fuel supply part to the second supply channel to maintain the second region at a second temperature;
an intermediate channel through which the fuel is supplied to a burning apparatus in the intermediate region; and
a switch part configured to connect the intermediate channel to the first supply channel or the second supply channel,
wherein the fuel is supplied from the fuel supply part to the burning apparatus in the intermediate region through the first control part when the intermediate channel is connected to the first supply channel by the switch part, and the fuel is supplied from the fuel supply part to the burning apparatus in the intermediate region through the second control part when the intermediate channel is connected to the second supply channel by the switch part,
wherein the first region and the intermediate region are consolidated into a first uniform temperature baking room by opening the movable first partition and closing the movable second partition, so that the first baking process is performed in the first uniform temperature baking room at a first uniform temperature equal to the first temperature with the intermediate channel being connected to the first supply channel, and
wherein the second region and the intermediate region are consolidated into a second uniform temperature baking room by closing the movable first partition and opening the movable second partition, so that the second baking process is performed in the second uniform temperature baking room at a second uniform temperature equal to the second temperature with the intermediate channel being connected to the second supply channel.

2. The oven as claimed in claim 1, further comprising:
a pre-heating chamber configured to heat the conveying part before the food material is loaded onto the conveying part.

3. The oven as claimed in claim 1, wherein
each of the movable first partition and the movable second partition includes a rotatable first partitioning plate and a rotatable second partitioning plate that are arranged such that the rotatable first partitioning plate is closer to an upper surface of the conveying part onto which the food material is loaded than the rotatable second partitioning plate and the rotatable second partitioning plate is closer to a lower surface of the conveying part than the rotatable first partitioning plate.

4. The oven as claimed in claim 1, wherein each of the movable first partition and the movable second partition includes a partitioning plate rotatable about a rotating shaft parallel to a width direction of the conveying part, the width direction being parallel to an outer surface of the conveying part on which the food material is placed.

5. An oven, comprising:
a conveying part configured to convey a food material on an upper surface of the conveying part;
a first region to perform a first baking process on the conveyed food material;
a second region to perform a second baking process on the conveyed food material;
an intermediate region between the first region and the second region;
a movable first partition provided between the first region and the intermediate region; and
a movable second partition provided between the intermediate region and the second region,
wherein the intermediate region is added as a region to perform the first baking process to the first region in response to the movable first partition being opened and the movable second partition being closed,
wherein the intermediate region is added as a region to perform the second baking process to the second region in response to the movable first partition being closed and the movable second partition being opened, and
wherein each of the movable first partition and the movable second partition includes a rotatable first partitioning plate and a rotatable second partitioning plate that are arranged such that the rotatable first partitioning plate is closer to the upper surface of the conveying part than the rotatable second partitioning plate and the rotatable second partitioning plate is closer to a lower surface of the conveying part than the rotatable first partitioning plate, the rotatable first partitioning plate being rotated between a first position perpendicular to the upper surface of the conveying part and a second position parallel to the upper surface of the conveying part, the rotatable second partitioning plate being rotated between a third position perpendicular to the lower surface of the conveying part and a fourth position parallel to the lower surface of the conveying part.

6. An oven, comprising:
a conveying part configured to convey a food material;
a first region to perform a first baking process on the conveyed food material;
a second region to perform a second baking process on the conveyed food material;
an intermediate region between the first region and the second region;
a movable first partition provided between the first region and the intermediate region;
a movable second partition provided between the intermediate region and the second region;
a fuel supply part configured to supply fuel;
a first supply channel connected to the fuel supply part to supply the fuel to a burning apparatus in the first region;
a first control part provided in the first supply channel and configured to control an amount of the fuel supplied from the fuel supply part to the first supply channel to maintain the first region at a first temperature;
a second supply channel connected to the fuel supply part to supply the fuel to a burning apparatus in the second region;
a second control part provided in the second supply channel and configured to control an amount of the fuel supplied from the fuel supply part to the second supply channel to maintain the second region at a second temperature;
an intermediate channel through which the fuel is supplied to a burning apparatus in the intermediate region;
a first valve provided between the first supply channel and the intermediate channel, and configured to be opened to connect the intermediate channel to the first supply channel to supply the fuel from the fuel supply part to the burning apparatus in the intermediate region through the first control part; and
a second valve provided between the second supply channel and the intermediate channel, and configured to be opened to connect the intermediate channel to the second supply channel to supply the fuel from the fuel supply part to the burning apparatus in the intermediate region through the second control part,
wherein the first region and the intermediate region are consolidated into a first uniform temperature baking room by opening the movable first partition and closing the movable second partition, so that the first baking process is performed in the first uniform temperature baking room at a first uniform temperature equal to the first temperature with the first valve being opened and the second valve being closed, and
wherein the second region and the intermediate region are consolidated into a second uniform temperature baking room by closing the movable first partition and opening the movable second partition, so that the second baking process is performed in the second uniform temperature baking room at a second uniform temperature equal to the second temperature with the second valve being opened and the first valve being closed.

* * * * *